United States Patent

Hardy

[11] Patent Number: 6,130,943
[45] Date of Patent: Oct. 10, 2000

[54] METHOD AND APPARATUS FOR SUPPRESSING ECHO IN TELEPHONY

[75] Inventor: William Christopher Hardy, Dallas, Tex.

[73] Assignee: MCI Communications Corporation, Washington, D.C.

[21] Appl. No.: 08/772,295

[22] Filed: Dec. 23, 1996

[51] Int. Cl.[7] .................................................. H04M 1/00
[52] U.S. Cl. ........................ 379/406; 379/410; 370/291
[58] Field of Search ..................... 379/406, 411, 379/3, 399, 409; 364/572; 370/286, 288, 289, 290, 291

[56] References Cited

U.S. PATENT DOCUMENTS

| | | | |
|---|---|---|---|
| 3,125,724 | 3/1964 | Foulkes et al. | 325/154 |
| 3,175,051 | 3/1965 | Cutler | 179/170.2 |
| 3,567,873 | 3/1971 | Peroni | 379/406 |
| 3,622,714 | 11/1971 | Berkley | 379/399 |
| 3,900,708 | 8/1975 | Bendel | 379/409 |
| 4,513,385 | 4/1985 | Muri | 364/572 |
| 4,623,980 | 11/1986 | Vary | 364/724.1 |
| 4,979,188 | 12/1990 | Kotzin et al. | 375/254 |
| 5,271,057 | 12/1993 | Addeo et al. | 379/202 |
| 5,386,465 | 1/1995 | Addeo et al. | 379/202 |
| 5,434,912 | 7/1995 | Boyer et al. | 379/202 |
| 5,481,316 | 1/1996 | Patel | 348/614 |
| 5,574,674 | 11/1996 | Pan | 364/726.01 |
| 5,644,596 | 7/1997 | Sih | 375/232 |

OTHER PUBLICATIONS

Oppenheim et al., "Discrete–Time Signal Processing," Prentice–Hall, Inc., Englewood Cliffs, NJ, 1989, pp. 488–489.
Strum et al., Principles of Discrete Systems and Digtal Signal Pro., Addison Wesley, pp. 438, 520–521, 557–562, 1988.
Rabiner–Bernard Gold, Theory and Application of Digital Signal Processing, Prentice–Hall, pp. 388–390, 728–729, 1975.

*Primary Examiner*—Reinhard J. Eisenzopf
*Assistant Examiner*—Charles N. Appiah

[57] ABSTRACT

A method and an apparatus suppresses echo in telephone communication systems having a send path and a receive path. A first filter is coupled to the send path carrying a voice signal. The first filter removes a first set of frequencies but allows either fundamental frequencies or second harmonics in the voice signal to pass through. Thus, the first filter preserves the fundamental frequencies or the second harmonics in the voice signal. A complementary filter is coupled to the receive path carrying the echo. The complementary filter is used to remove the remaining frequencies that are present in the echo. By operating jointly in a complementary way, the first filter and the complementary filter removes the echo.

4 Claims, 4 Drawing Sheets

METHOD AND APPARATUS FOR SUPPRESSING ECHO IN TELEPHONY

BACKGROUND OF THE INVENTION

1. Field of the Invention

The present invention relates generally to telecommunications and more specifically to a filter that suppresses echo in telephonic communications.

2. Related Art

Echo is a phenomenon that occurs when people speak into telephone transmitters and subsequently hear their own voices repeated through the receivers. Simply put, echo is sound energy that is transmitted across the telephone network via a first transmission path, known as a send path, and reflected back to the sender's point of origin via a second transmission path, known as a receive path.

The primary cause of echo is due to the use of hybrids. Hybrids are devices used to interface two-wire telephone circuits to four-wire circuits, while maintaining full-duplex operation in the two-wire circuits. Full-duplex refers to communication circuits that are capable of transmitting and receiving signals in both directions at the same time. In contrast, half-duplex or simplex circuits only permit the transmission of signals in one direction at a time. For economical reasons, two-wire circuits are primarily used to implement the millions of subscriber local loops in commercial public telephone systems. Without the function that hybrids provide, it would not be possible to achieve full-duplex communications using economical two-wire circuits. More typical communication circuits consisting of four wires (one pair used for sending and the other pair for receiving), are used to implement most of the other transmission lines that comprise commercial telephone networks.

The unpleasant effects of echo are minimal in short transmission lines because echo is heard almost simultaneously with the originating speech. In this case, echo is perceived merely as voice feedback emanating from the telephone receiver as the caller talks.

However, in long transmission lines, the echo delay increases and it quickly becomes noticeable and, thus, substantially interferes with telephone conversations. Not surprisingly, telephone engineers have long sought to reduce and/or eliminate signal echo from telephone transmission circuits. Several methods have been used by the telecommunications industry in addressing this problem. Such methods are listed below and are discussed in greater detail subsequently herein.

In order to describe the present invention and the conventional techniques used to control echo, the following terminology and conventions are used throughout this disclosure. In the examples, the two parties having a telephone conversation are referred to as the "calling" party and the "called" party. Generally the calling party is speaking and the called party is listening. The two distinct transmission paths between the calling party and the called party are defined from the point of view of the calling party. Thus, while the calling party is speaking, the voice signal travels along the first transmission path referred to herein as the "send" path. The voice signal is referred to as the "desired" signal, which is to be contrasted with the undesired signal or echo. The echo, which is generated by a reflection of the desired signal from a point close in proximity to the called party, travels along a second transmission path referred to herein as the "receive" path.

Of course during a typical conversation, information flows in both directions. Thus when the called party speaks, the desired signal now travels along the opposite path, described above as the receive path. Likewise, the echo is reflected back to the called party, along the path described above as the send path. During an average two-way conversation, the desired signal and the echo signal continuously change paths and direction, depending on which party is speaking. Consequently, even though only one direction may be discussed in the examples below for the sake of clarity, similar results would occur if the direction of speech and transmission paths were reversed.

Early forms of echo control are quite simplistic in nature. Path attenuation is introduced in both the send path and the receive paths. Since the echo signal must travel twice as far as the desired signal, it receives a greater attenuation and is thereby reduced to acceptable levels. The problem with this method is that the injected attenuation also reduces the energy level of the desired signal. Once transmission lines exceed a certain length, this solution becomes inadequate because the attenuation required to reduce echo to acceptable levels, also degrades the desired signal to unacceptable levels.

An echo control method used in the telecommunications industry is called echo cancellation. This method operates upon a copy of the desired signal from the send path to produce a cancellation signal. The cancellation signal is 180 degrees out of phase with the desired signal. It is then added to the signal in the receive path (that contains the echo), along with the proper delay and attenuation to cancel the echo components therein. The problem with this method is that two devices are needed to effectively cancel echo on both ends of a connection. Since both ends of a connection are often not controlled by the same telephone carrier, the necessary device may be absent on one end or the other, leaving one of the parties exposed to the echo.

The foregoing problem is solved in an echo control device disclosed by the present inventor in U.S. patent application No. 08/580,714, filed Dec. 29, 1995. In that echo control device, a pair of complementary multiple bandpass filters is used to control the echo on both ends of a transmission line from a single point. A voice signal passes through a first multiple bandpass filter that removes a first set of frequency components therefrom. After such components are filtered out by the first multiple bandpass filter, there remains sufficient information in the filtered signal so that voice communication may continue. The echo signal is generated from the voice signal and therefore consists of only a second set of frequency components. The echo passes through a second multiple bandpass filter that filters out the second set of frequency components, thus completely eliminating the echo signal.

While the complementary multiple bandpass filters have been shown to be effective in eliminating echo, the filtering of the calling party voice signals impairs the quality of the voice heard by the called party. The removal of a first set of frequencies from the voice signals renders a low quality voice signal with a hollow sound that may be considered objectionable. Thus, experiments have continued for a set of filter functions that may be applied to the complementary multiple bandpass filters while not degrading signal quality.

SUMMARY OF THE INVENTION

The present invention is a method and an apparatus for eliminating echo while preserving the quality of a voice signal in telecommunication circuits. In the present invention, a pair of complementary filters are used to eliminate the echo. The first filter is placed in a send path of a telecommunication circuit. The second filter, which is complementary to the first filter, is placed in a receive path of the telecommunication circuit.

According to the present invention, the quality of the voice signal is preserved by selecting the complementary filters such that the voice signals from either side of the transmission line contain either the fundamental or the first harmonic of every frequency in the voice spectrum. As used in the description of the present invention, the first harmonic shall be understood to mean a frequency twice that of the fundamental frequency.

Each filter includes a multiple bandpass filter function having a plurality of passbands and stopbands.

When a voice signal traveling along the send path passes through the first filter, either all fundamental frequencies or their first harmonics in the voice signal are preserved. After an echo is generated from the voice signal, it travels along the receive path, and passes through the second filter which is complementary to the first filter. The echo consists of those frequencies which were not removed from the voice signal by the first filter. As the echo passes through the second filter, the frequencies that were not removed by the first filter are removed. Thus, the echo is completely eliminated.

The present invention preserves the quality of the voice signal by insuring that for any frequency present in the voice signal, the energy of either the fundamental or the first harmonic will be passed on to the listener. This is achieved by placing the passband-stopband boundaries on selected intervals.

Further, according to the present invention, discrete Fourier transform is used to implement the first and second filters. When the voice signal is transformed into frequency domain using discrete Fourier transform, each component has same phase which reduces hollowness that is manifested when the voice signal is filtered to eliminate frequencies.

Moreover, according to the present invention, filtering with the discrete fourier transform is implemented with the windowing scheme that maintains continuity on the boundary points of the consecutive samples.

Further features and advantages of the invention, as well as the structure and operation of various embodiments of the invention, are described in detail below with reference to the accompanying drawings.

BRIEF DESCRIPTION OF THE FIGURES

The present invention will be described with reference to the accompanying drawings, wherein.

In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

1. Overview and Discussion of the Invention

The present invention is directed toward a method and an apparatus for eliminating echo while preserving the quality of a voice signal in telecommunication circuits. In the present invention, a pair of complementary filters are used to eliminate the echo. The first filter is placed in a send path of a telecommunication circuit. The second filter, which is complementary to the first filter, is placed in a receive path of the telecommunication circuit.

According to the present invention, the quality of the voice signal is preserved by selecting the complementary filters such that the voice signals from either side of the transmission line contain either the fundamental or the second harmonic of every frequency in the voice spectrum. Each filter includes a multiple bandpass filter function having a plurality of passbands and stopbands.

When a voice signal traveling along the send path passes through the first filter, either all fundamental frequencies or their first harmonics in the voice signal are preserved. After an echo is generated from the voice signal, it travels along the receive path, and passes through the second filter which is complementary to the first filter. The echo consists of those frequencies which were not removed from the voice signal by the first filter. As the echo passes through the second filter, the frequencies that were not removed by the first filter are removed. Thus, the echo is completely eliminated.

The present invention preserves the quality of the voice signal by insuring that for any frequency present in the voice signal, the energy of either the fundamental or the first harmonic will be passed on to the listener. This is achieved by placing the passband-stopband boundaries on selected intervals.

Further, according to the present invention, discrete Fourier transform is used to implement the first and second filters. When the voice signal is transformed into frequency domain using discrete Fourier transform, each component has same phase which reduces hollowness that is manifested when the voice signal is filtered to eliminate frequencies. The manner in which this is accomplished is described in detail below.

2. Example Environment

Before describing the invention in detail, it is useful to describe an example environment in which the invention can be implemented. In the broadest sense, the invention can be implemented in any telecommunication circuit where echo may impair the quality of voice communication. One such environment is an ordinary telephone link between a calling party and a called party.

Figure 1:
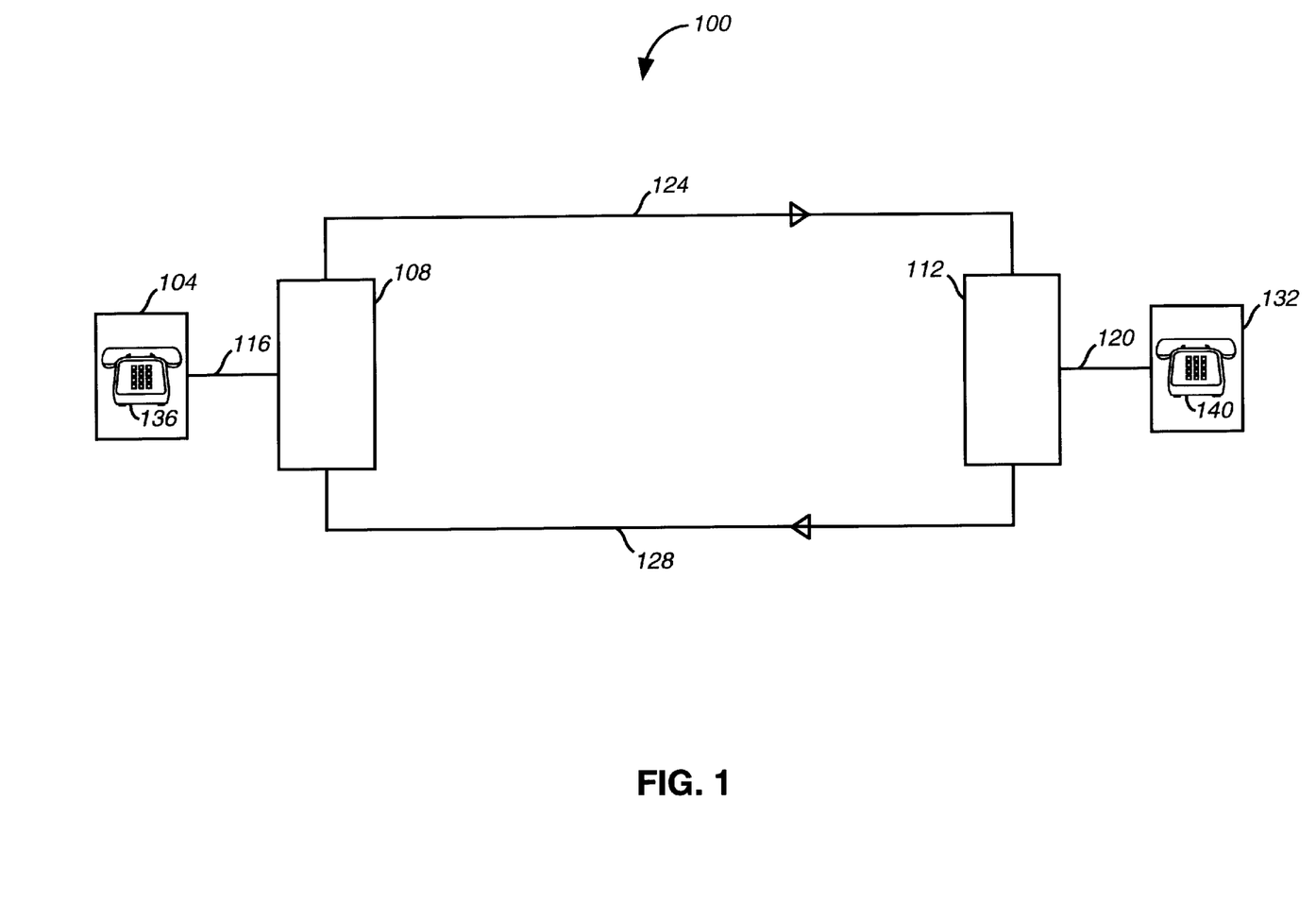
FIG. 1 is a block diagram illustrating an ordinary telephone link between a calling party and a called party.

FIG. 1 illustrates a block diagram of a telephone link 100. Specifically, FIG. 1 includes a calling party 104, hybrids 108 and 112, a two-wire calling party customer loop 116, a two-wire called party customer loop 120, a send path (a four-wire transmission line) 124, a receive path (a four wire transmission line) 128, a called party 132, and telephones 136 and 140.

In this example environment, it is assumed that the calling party 104 is speaking and the called party 132 is listening. In other words, the voice signal is being transmitted in the direction of the arrow in the send path 124, and the undesired echo is transmitted in the direction of the arrow in the receive path 128. The calling party 104 is speaking from the telephone 136 connected to the customer loop 116. Likewise, the called party 132 is speaking from the telephone 140 connected to the customer loop 120.

In the telephone link 100, the hybrid 108 functions as an interface between the customer loop 116 and the send path 124. Likewise, hybrid 112 functions as an interface between the customer loop 120 and the receive path 128. Furthermore, hybrids 108 and 112 maintain full duplex operation in the customer loops 116 and 120. Full duplex refers to communication circuits that are capable of transmitting and receiving signals in both directions simultaneously. In contrast, half-duplex or simplex circuits only allow transmission of signals in one direction at a time. Although the hybrids 108 and 112 play a vital role in the telephone link 100, they are also the primary cause of the echo. Because the formation of the echo due to the hybrids is well known in the art, it will not be described here.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

Figure 2:
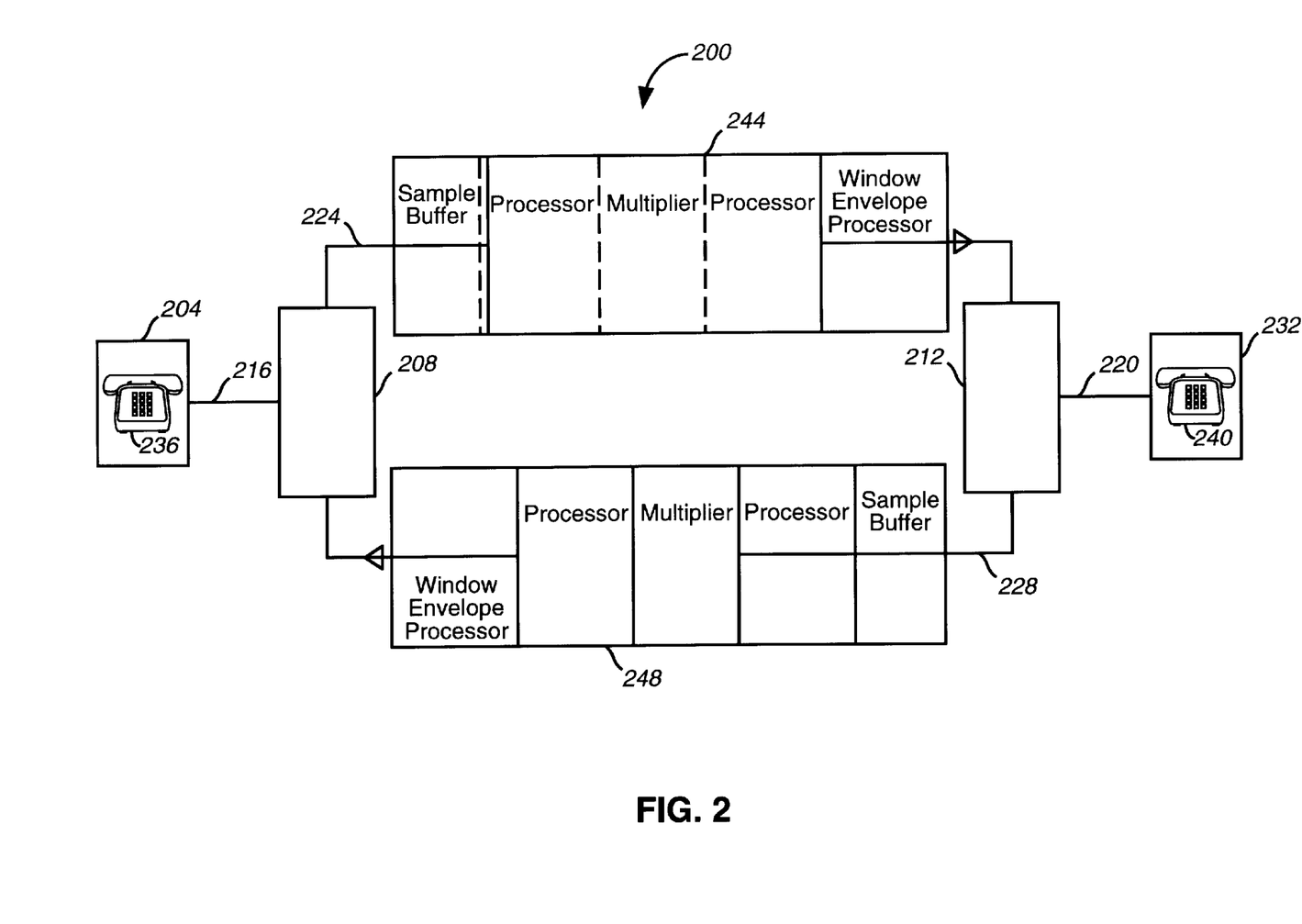
FIG. 2 is a block diagram illustrating a telephone link in accordance with the present invention.

The present invention will now be described with reference to FIG. 2. FIG. 2 illustrates a block diagram of a telephone link 200 in accordance with the present invention. Specifically, FIG. 2 includes a calling party 204, hybrids 208 and 212, a two-wire calling party customer loop 216, a two-wire called party customer loop 220, a send path (on two wires of a four-wire transmission line) 224, a receive path (on two wires of a four-wire transmission line) 228, a called party 232, telephones 236, 240, a first filter 244, and a complementary filter 248.

In FIG. 2, the hybrid 208 functions as an interface between two-wire calling party customer loop 216 and four-wire transmission line 224 (the send path) and 228 (the receive path). Likewise, the hybrid 212 finctions as an interface between the two-wire called party customer loop 220 and the four-wire transmission line 224 (the send path) and 228 (the receive path).

Before describing exactly how echo is suppressed in the present invention, it is useful to further describe the voice signal and the echo. When the calling party 204 speaks from the telephone 236, the voice signal travels along the send path 224 in the direction of the arrow. The voice signal is composed of many frequencies and higher order harmonics. When the voice signal reaches the hybrid 212 at the end of the send path 224, the echo is created. The echo, which travels along the receive path 228 in the direction of the arrow, is a derivative of the voice signal, and is composed of the same frequencies and higher order harmonics as the voice signal. Thus, the voice signal and its echo have the same frequency spectrum. As a result, if a fundamental frequency is filtered out, and thus removed, from the voice signal, the fundamental frequency will also be missing from the echo. Likewise, if a first harmonic is removed from the voice signal, the first harmonic will also be missing from the echo.

Having described the voice signal and the echo, we now return to FIG. 2 wherein the first filter 244 is coupled to the send path 224, and the complementary filter 248 is coupled to the receive path 228. Each filter 244 and 248 includes a multiple bandpass filter response having a plurality of passbands and stopbands. The passbands are selected such that, for any given frequency passing through the filter 244, either the fundamental frequency or the first harmonic will fall within one of the passbands. Thus, all fundamental frequencies or their first harmonics in the voice signal are preserved. The present invention preserves the quality of the voice signal by insuring that for any frequency present in the voice signal, the energy of either the fundamental frequency or the first harmonic will be passed on to the listener.

For instance, assume that the first filter 244 preserves the first harmonics and filters out other frequencies in the voice signal in the send path 224. The voice signal still retains the high quality because the energy of the first harmonics is passed on to the called party 232.

In the present invention, the filters 244 and 248 operate in a complementary fashion in that the passbands of the first filter 244 coincide with the stopbands of the complementary filter 248. The frequencies that were not removed by the filter 244 will be removed by the filter 248. In other words, if the fundamental frequencies of the voice signal are preserved in the send path, the fundamental frequencies and all other remaining harmonics in the echo will be removed by the complementary filter 248 in the receive path 228. By operating in a complementary way, the filters 244 and 248 eliminate the echo.

Meanwhile, back to the above example, since the second harmonics of the voice signal are preserved by the first filter 244 in the send path 224, the echo will have the first harmonics. Then, in accordance with the invention, the first harmonics and all other remaining harmonics in the echo will be removed by the complementary filter 248 in the receive path 228. As a result, the echo will be eliminated in the receive path 228.

Figure 3:
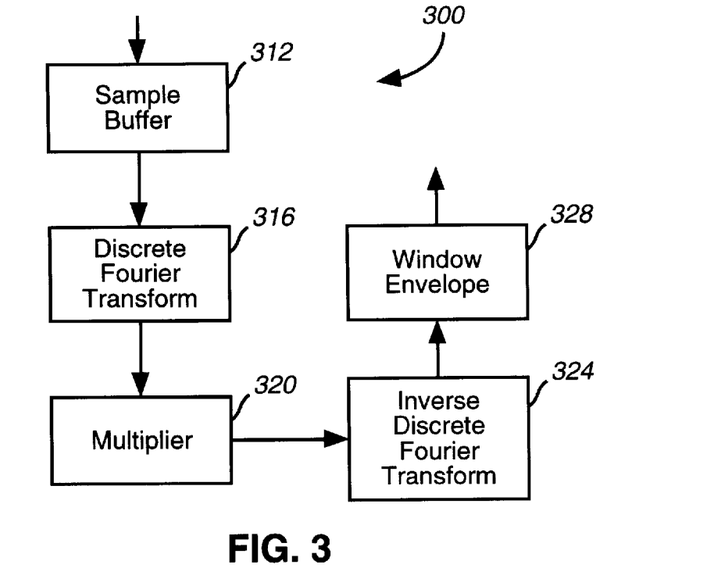
FIG. 3 is a block diagram illustrating a filter in accordance with the present invention.

FIG. 3 is a block diagram 300 illustrating the first filter 244 (or the complementary filter 248) in accordance with the present invention. Specifically, FIG. 3 includes a sample buffer 312, a discrete Fourier transform (DFT) 316, a multiplier 320, an inverse DFT 324 and a window envelope 328.

Referring now to FIG. 3, a digitized voice signal is received by the sample buffer 312 where a first group of signal samples, such as 2048 consecutive signal samples, are selected. Next, the first group of signal samples are received by the DFT 316 where a discrete Fourier transform is performed on the first group of signal samples. In the present invention, the DFT 316, rather than a fast Fourier transform, is selected because imaginary components of the samples that convey phase information are not produced by the DFT 316.

At the DFT 316, the first group of signal samples are transformed into frequency domain samples. The DFT 316 outputs a first vector which represents a frequency spectrum of the samples. At the output of the DFT 316, each component has same phase which reduces the hollowness that is manifested when the voice signal is filtered to eliminate frequencies.

Next, the first vector representing the frequency spectrum is received by a multiplier 320, where the first vector is multiplied by a first filter function. The first filter function which represents a first bandpass filter, includes a plurality of first passbands and first stopbands such that, for any given frequency present, either the fundamental frequency or the first harmonic will be preserved. In designing the first bandpass filter, this is achieved by placing passband-stopband boundaries on selected intervals wherein successive higher frequency passbands double in bandwidth and spacing. For example, a set of passbands in accordance with the present invention can be 2–16 Hz, 32–64 Hz, 128–256 Hz, 512–1024 Hz and 2048–4000 Hz. The multiplier 320 operates on the vector representing the frequency spectrum and outputs a masked spectrum, referred as a first masked vector.

Next, the first masked vector is received at the inverse DFT 324 where an inverse discrete Fourier transform is performed thereon. The inverse DFT 324 transforms the first masked vector into a time domain digitized signal.

Next, the time domain digitized signal is received by the window envelope 328 which selects a second group of windowed samples, such as the middle 1024 samples. The window envelope 328 ignores the first 512 and last 512 samples from the first group of samples. The last 1024 samples are later used as the first 1024 samples during the next round of filtering.

Figure 4:
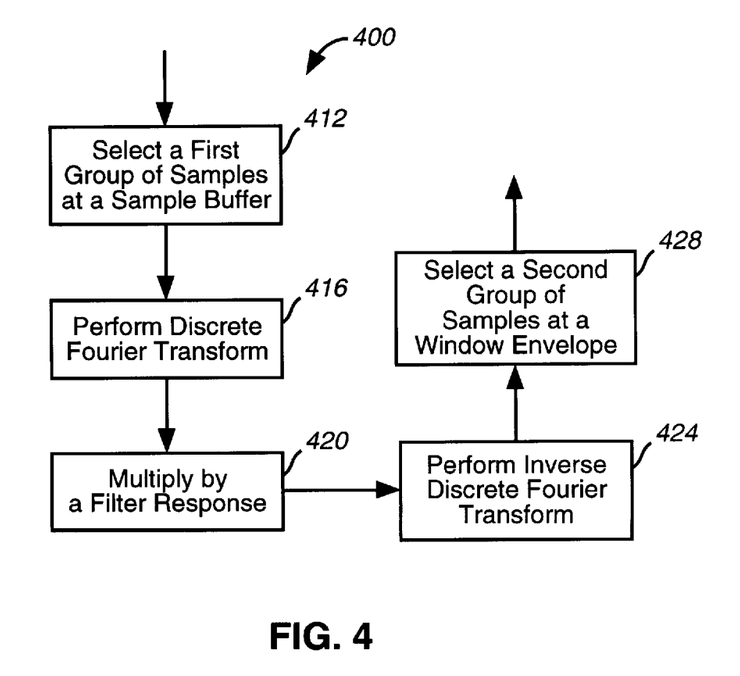
FIG. 4 is an operational flow diagram illustrating the process of suppressing echo in accordance with the present invention.

FIG. 4 is an operational flow diagram 400 illustrating the process of suppressing echo in accordance with the first filter 244 (or the complementary filter 248). In a step 412, the digitized voice signal is received by the sample buffer 312 which selects a first group of signal samples, such as 2048 consecutive samples. In a step 416, the first group of signal samples are received by the DFT 316 where the discrete Fourier transform is performed on the first group of signal samples. At the DFT 316, the first group of signal samples are transformed into frequency domain samples. The DFT 316 outputs the first vector which represents the frequency spectrum of the samples. In a step 420, the first vector representing the frequency spectrum is received by the multiplier 320, where it is multiplied by a filter function. The multiplier 320 operates on the vector representing the frequency spectrum and generates the first masked vector, also referred as the masked spectrum. In a step 424, the first masked vector is received by the inverse DFT 324 where the inverse discrete Fourier transform is performed thereon. The inverse DFT 324 transforms the first masked vector into the time domain digitized signal. Finally, in a step 428, the time domain digitized signal is received by the window envelope 328 which selects a second group of windowed samples, such as the middle 1024 samples from the first group of samples.

Figure 5:
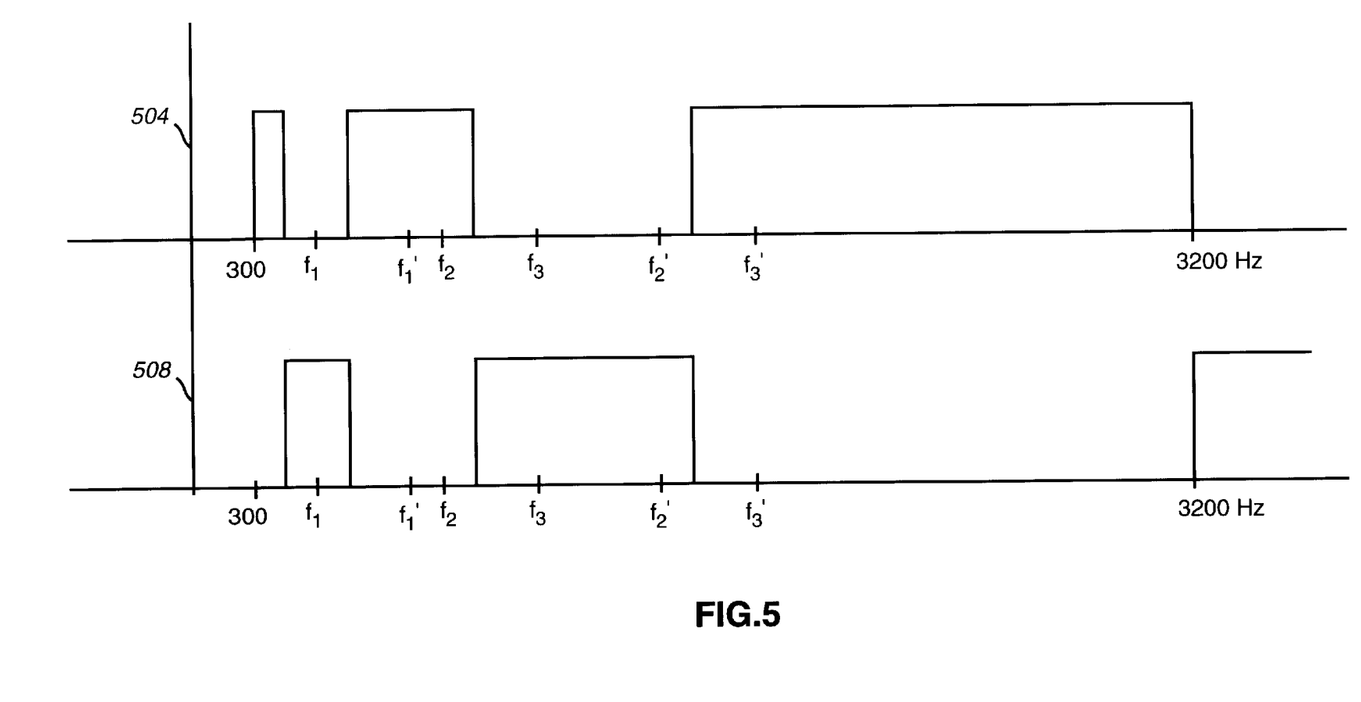
FIG. 5 depicts an example of functional characteristics of multiple bandpass filter responses.

FIG. 5 depicts an example of the functional characteristics of each bandpass filter associated with the first filter 244 and the complementary filter 248. The actual frequencies that are depicted in FIG. 5 as being removed, are shown merely as an example in order to distinctly point out the functional characteristics of the present invention.

Graph 504 depicts an example of the characteristics of the bandpass filter associated with the first filter 244, and graph 508 depicts an example of the characteristics of the bandpass filter associated with the complementary filter 248. As indicated by the horizontal axes of the graphs 504 and 508, both filters 244 and 248 operate within the voice transmission bandwidth provided by modem telephone transmission lines, approximately 300 to 3200 Hertz. The vertical axes represent attenuation levels applied to the corresponding frequency components for signals that pass through the multiple bandpass filters according to the present invention. Attenuation levels that are high enough to effectively remove the corresponding frequency components from the signals that pass though each filter are selected.

Referring now to graph 504, frequency f1 is blocked from the voice signal that passes through the first filter 244, but frequency f1', which is the second harmonic of f1, is allowed to pass through. Similarly, frequency f2 is allowed to pass through, but frequency f2', which is the second harmonic of f2, is removed. As indicated by graph 504, this pattern of blocking out, passing through, blocking out, etc., continues for the entire frequency spectrum of 300–3200 Hertz.

Like the first filter 244, the complementary filter 248 works the same way, but operates on a complementary sets of frequencies. In other words, each set of frequencies that is preserved by the first filter 244, as depicted by graph 504, is filtered out by the complementary filter 248, as depicted by graph 508.

Referring now to graph 508, the complementary filter 248 allows the frequency f1 to pass through, but blocks the frequency f1', the first harmonic of f1. Next, the frequency f2 is blocked, but the frequency f2', the first harmonic of f2, is allowed to pass through. As can be seen by graph 504, this pattern of blocking out, passing through, blocking out, etc., continues along the entire voice frequency spectrum of 300–3200 Hertz.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An apparatus for suppressing echo in a telecommunications network having a send path carrying a voice signal and a receive path carrying the echo, the apparatus comprising:
   a first filter coupled to the send path for producing a transformed send path signal having selected frequencies attenuated, the first filter including:
      a first sample buffer for receiving and storing $2^n$ digitized samples of the send path signal, wherein n is an integer greater than 0,
      a first processor implementing a discrete, real-valued Fourier transform of the contents of the sample buffer, which circumvents problems introduced by reliance on Fourier transforms with complex coefficients,
      a first multiplier that attenuates one set of frequencies in the voice spectrum according to the rule that if a frequency in the voice spectrum is attenuated then the first harmonic of that frequency is not attenuated, and if the first harmonic of a frequency in the voice spectrum is attenuated then that frequency is not attenuated, and
      a second processor implementing a discrete, real-valued inverse Fourier transform of the power of the voice frequency spectrum after selective attenuation by the first multiplier, to produce digitized samples of the transformed send path signal wherein all frequencies modeled have the same phase; and
   a second filter coupled to the receive path for producing a transformed receive path signal having selected frequencies attenuated, the second filter including:
      a second sample buffer for receiving and storing $2^n$ digitized samples of the receive path signal,
      a third processor implementing a discrete, real-valued Fourier transform of the contents of the second sample buffer, which circumvents problems introduced by reliance on Fourier transforms with complex coefficients,
      a second multiplier that attenuates a complementary set of frequencies in the voice spectrum according to the rule that any frequency attenuated by the first multiplier is not attenuated by the second multiplier and any frequency not attenuated by the first multiplier is attenuated by the second multiplier, and
      a fourth processor implementing a discrete, real-valued inverse Fourier transform of the power of the voice frequency spectrum after selective attenuation by the second multiplier to produce digitized samples of the transformed receive path signal wherein all frequencies modeled have the same phase.

2. An apparatus for suppressing echo in a telecommunications network having a send path carrying a voice signal and a receive path carrying the echo, the apparatus comprising:

a first filter coupled to the send path for producing a transformed send path signal having selected frequencies attenuated, the first filter including:
  a first sample buffer for receiving and storing $2^n$ digitized samples of the send path signal, wherein n is an integer greater than 0,
  a first processor implementing a discrete, real-valued Fourier transform of the contents of the sample buffer, which circumvents problem introduced by reliance on Fourier transforms with complex coefficients,
  a first multiplier that attenuates one set of frequencies in the voice spectrum according to the rule that if a frequency in the voice spectrum is attenuated then the first harmonic of that frequency is not attenuated and if the first harmonic of a frequency in the voice spectrum is attenuated then that frequency is not attenuated,
  a second processor implementing a discrete, real-valued inverse Fourier transform of the power of the voice frequency spectrum after selective attenuation by the first multiplier to produce digitized samples of the transformed send path signal wherein all frequencies modeled have the same phase, and
  a first window envelope including a first transmitter for transmitting a middle half of the transformed send path signal and a first buffer handling processor that causes a bottom half of the first sample buffer to be moved up and appended with the next $2^{n-1}$ digitized samples of the send path signal thereby using windowing that avoids artificialities inherent in classical techniques; and
a second filter coupled to the receive path for producing a transformed receive path signal having selected frequencies attenuated, the second filter including:
  a second sample buffer for receiving and storing $2^n$ digitized samples of the receive path signal,
  a third processor implementing a discrete, real-valued Fourier transform of the contents of the second sample buffer, which circumvents problems introduced by reliance on Fourier transforms with complex coefficients,
  a second multiplier that attenuates a complementary set of frequencies in the voice spectrum according to the rule that any frequency attenuated by the first multiplier is not attenuated by the second multiplier and any frequency not attenuated by the first multiplier is attenuated by the second multiplier,
  a fourth processor implementing a discrete, real-valued inverse Fourier transform of the power of the voice frequency spectrum after selective attenuation by the second multiplier to produce digitized samples of the transformed receive path signal wherein all frequencies modeled have the same phase, and
  a second window envelope including a second transmitter for transmitting a middle half of the transformed receive path signal and a second buffer handling processor that causes a bottom half of the second sample buffer to be moved up and appended with the next $2^{n-1}$ digitized samples of the receive path signal thereby using windowing that avoids artificialities inherent in classical techniques.

3. A method for suppressing echo in a telecommunications network having a send path carrying a voice signal and a receive path carrying the echo, comprising:
  producing a transformed send path signal having selected frequencies attenuated, including:
    receiving and storing $2^n$ digitized samples of the send path signal, wherein n is an integer greater than 0,
    implementing a discrete, real-valued Fourier transform for the $2^n$ digitized samples thereby circumventing problems introduced by reliance on Fourier transforms with complex coefficients,
    attenuating one set of frequencies in the voice spectrum according to the rule that if a frequency in the voice spectrum is attenuated then the first harmonic of that frequency is not attenuated and if the first harmonic of a frequency in the voice spectrum is attenuated then that frequency is not attenuated, and
    implementing a discrete, real-valued inverse Fourier transform of the power of the voice frequency spectrum after selective attenuation to produce digitized samples of the transformed send path signal, wherein all frequencies modeled have the same phase; and
  producing a transformed receive path signal having selected frequencies attenuated, including:
    receiving and storing $2^n$ digitized samples of the receive path signal,
    implementing a discrete, real-valued Fourier transform of the $2^n$ digitized samples thereby circumventing problems introduced by reliance on Fourier transforms with complex coefficients,
    attenuating a complementary set of frequencies in the voice spectrum according to the rule that any frequency attenuated in the step of producing a transformed send path signal is not attenuated in this step and any frequency not attenuated in the step producing a transformed send path signal is attenuated in this step, and
    implementing a discrete, real-valued inverse Fourier transform of the power of the voice frequency spectrum after selective attenuation to produce digitized samples of the transformed receive path signal, wherein all frequencies modeled have the same phase.

4. A method for suppressing echo in a telecommunications network having a send path carrying a voice signal and a receive path carrying the echo, comprising:
  producing a transformed send path signal having selected frequencies attenuated, including:
    receiving and storing $2^n$ digitized samples of the send path signal, wherein n is an integer greater than 0,
    implementing a discrete real-value Fourier transform, for the $2^n$ digitized samples thereby circumventing problems introduced by reliance on Fourier transforms with complex coefficients,
    attenuating one set of frequencies in the voice spectrum according to the rule that if a frequency in the voice spectrum is attenuated then the first harmonic of that frequency is not attenuated and if the first harmonic of a frequency in the voice spectrum is attenuated then that frequency is not attenuated, and
    implementing a discrete real-valued inverse Fourier transform of the power of the voice frequency spectrum after selective attenuation to produce digitized samples of the transformed send path signal, transmitting a middle half of the transformed send path signal, wherein all frequencies modeled have the same phase, and moving and appending a bottom half of the transformed path signal with the next $2^{n-1}$ digitized samples of the send path signal, thereby using windowing that avoids artificialities inherent in classical techniques; and producing a transformed receive path signal having select frequencies attenuated, including:
- receiving and storing $2^n$ digitized samples of the receive path signal,
- implementing a discrete, real-valued Fourier transform of the $2^n$ digitized samples thereby circumventing problems introduced by reliance on Fourier transforms with complex coefficients,
- attenuating a complementary set of frequencies in the voice spectrum according to the rule that any frequency attenuated in the step of producing a transformed send path signal is not attenuated in this step and any frequency not attenuated in the step of producing a transformed send path signal is attenuated in this step, and
- implementing a discrete, real-valued inverse Fourier transform of the power of the voice frequency spectrum after selective attenuation to produce digitized samples of the transformed receive path signal, wherein all frequencies modeled have the same phase, transmitting a middle half of the transformed send path signal, and moving and appending a bottom half of the transformed path signal with the next $2^{n-1}$ digitized samples of the send path signal, thereby using windowing that avoids artificialities inherent in classical techniques.

* * * * *